(12) United States Patent
Liu et al.

(10) Patent No.: US 10,571,672 B2
(45) Date of Patent: Feb. 25, 2020

(54) FILTER ARRAY BASED ULTRAFAST COMPRESSIVE IMAGE SENSOR

(71) Applicant: The Regents of the University of California, Oakland, CA (US)

(72) Inventors: Zhaowei Liu, San Diego, CA (US); Eric Huang, San Diego, CA (US); Qian Ma, San Diego, CA (US)

(73) Assignee: The Regents of the University of California, Oakland, CA (US)

( * ) Notice: Subject to any disclaimer, the term of this patent is extended or adjusted under 35 U.S.C. 154(b) by 175 days.

(21) Appl. No.: 15/675,537

(22) Filed: Aug. 11, 2017

(65) Prior Publication Data

US 2018/0045938 A1 Feb. 15, 2018

Related U.S. Application Data

(60) Provisional application No. 62/374,652, filed on Aug. 12, 2016.

(51) Int. Cl.
  *G02B 21/00* (2006.01)
  *G02B 21/36* (2006.01)
  (Continued)

(52) U.S. Cl.
  CPC ......... *G02B 21/0044* (2013.01); *G02B 5/201* (2013.01); *G02B 21/086* (2013.01);
  (Continued)

(58) Field of Classification Search
  CPC .. G02B 21/0044; G02B 21/086; G02B 5/201; G02B 21/365; G02B 27/58;
  (Continued)

(56) References Cited

U.S. PATENT DOCUMENTS 7,189,460 B2 * 3/2007 Shin .................. C23C 14/024
  428/446
2002/0159064 A1 * 10/2002 Wakabayashi ............ G01J 9/00
  356/402

(Continued)

OTHER PUBLICATIONS

August, Yitzhak, et al., "Compressive hyperspectral imaging by random separable projections in both the spatial and the spectral domains." Applied optics 52.10 (2013): D46-D54.

(Continued)

*Primary Examiner* — Stephone B Allen
*Assistant Examiner* — Rahman Abdur
(74) *Attorney, Agent, or Firm* — Mintz Levin Cohn Ferris Glovsky and Popeo, P.C.

(57) ABSTRACT

An apparatus for compressive sensing may include a filter array, a detector, and a reconstruction engine. The filter array may be configured to generate a first illumination pattern in response to a first wavelength of light and a second illumination pattern in response to a second wavelength of light. The first illumination pattern and the second illumination pattern may be projected onto an object. The detector may be configured to determine a first intensity of a first light emitted by the object in response to the first illumination pattern and a second intensity of a second light emitted by the object in response to the second illumination pattern. The reconstruction engine may be configured to generate an image of the object based at least on the first intensity, the first illumination pattern, the second intensity, and the second illumination pattern.

19 Claims, 10 Drawing Sheets

(51) Int. Cl.
G02B 21/08 (2006.01)
G02B 5/20 (2006.01)
G02B 27/58 (2006.01)
(52) U.S. Cl.
CPC ......... *G02B 21/361* (2013.01); *G02B 21/365* (2013.01); *G02B 27/58* (2013.01)
(58) Field of Classification Search
CPC ...... G02B 21/361; G02B 21/008; G02B 5/20; G02B 21/0032; G06T 7/00; G06T 1/00
USPC ....................................................... 359/363
See application file for complete search history.

(56) References Cited

U.S. PATENT DOCUMENTS

| 2007/0268568 | A1* | 11/2007 | Higashi | H01S 5/141 359/333 |
|---|---|---|---|---|
| 2013/0191027 | A1* | 7/2013 | Ionov | G01P 5/26 702/3 |
| 2015/0146282 | A1* | 5/2015 | Huber | H01S 5/141 359/349 |

OTHER PUBLICATIONS

Betzig, Eric, et al., "Imaging intracellular fluorescent proteins at nanometer resolution." Science 313.5793 (2006): 1642-1645.
Buehler, Ch, et al., "Time-resolved polarization imaging by pump-probe (stimulated emission) fluorescence microscopy." Biophysical journal 79.1 (2000): 536-549.
Candès, Emmanuel J., and Michael B. Wakin. "An introduction to compressive sampling [a sensing/sampling paradigm that goes against the common knowledge in data acquisition]." IEEE signal processing magazine 25.2 (2008): 21-30.
Chan, Wai Lam, et al., "A single-pixel terahertz imaging system based on compressed sensing." Applied Physics Letters 93.12 (2008): 121105-1-121105-3.
Diebold, Eric D., et al., "Giant tunable optical dispersion using chromo-modal excitation of a multimode waveguide." Optics express 19.24 (2011): 23809-23817.
Duarte, Marco F., et al., "Single-pixel imaging via compressive sampling." IEEE signal processing magazine 25.2 (2008): 83-91.
Etoh, T. Goji, et al., "Evolution of ultra-high-speed CCD imagers." Plasma and Fusion Research 2 (2007): S1021-1-S1021-8.
Fiolka, Reto, et al., "Time-lapse two-color 3D imaging of live cells with doubled resolution using structured illumination." Proceedings of the National Academy of Sciences 109.14 (2012): 5311-5315.
Goda, Keisuke, Kevin K. Tsia, and Bahram Jalali. "Amplified dispersive Fourier-transform imaging for ultrafast displacement sensing and barcode reading." Applied Physics Letters 93.13 (2008): 131109-1-131109-3.
Gustafsson, Mats GL. "Surpassing the lateral resolution limit by a factor of two using structured illumination microscopy." Journal of microscopy 198.2 (2000): 82-87.
Hell, Stefan W., and Jan Wichmann, "Breaking the diffraction resolution limit by stimulated emission: stimulated-emission-depletion fluorescence microscopy." Optics letters 19.11 (1994): 780-782.
Huang, Eric, Qian Ma, and Zhaowei Liu., "Ultrafast imaging using spectral resonance modulation." Scientific reports 6:25240 (2016) (7 pages).
Jaenisch, Rudolf, and Adrian Bird. "Epigenetic regulation of gene expression: how the genome integrates intrinsic and environmental signals." Nature genetics vol. 33 (2003): 245-254.
Jin, Fulai, et al., "A high-resolution map of three-dimensional chromatin interactome in human cells." Nature 503.7475 (2013): 290-294.
Koh, Kwangmoo, Seung-Jean Kim, and Stephen Boyd. "An interior-point method for large-scale l1-regularized logistic regression." Journal of Machine learning research 8.Jul. 2007: 1519-1555.
Mahjoubfar, Ata, et al., "High-speed nanometer-resolved imaging vibrometer and velocimeter." Applied Physics Letters 98.10 (2011): 101107-1-101107-3.
Margulies, Marcel, et al., "Genome sequencing in microfabricated high-density picolitre reactors." Nature 437.7057 (2005): 376-380.
Mikkelsen, Tarjei S., et al., "Genome-wide maps of chromatin state in pluripotent and lineage-committed cells." Nature 448, Aug. 2, 2007: 553-560.
Pellett, Patrina A., et al., "Two-color STED microscopy in living cells." Biomedical optics express 2.8 (2011): 2364-2371.
Rust, Michael J., Mark Bates, and Xiaowei Zhuang., "Sub-diffraction-limit imaging by stochastic optical reconstruction microscopy (STORM)." Nature methods 3.10 (2006): (3 pages).
Stolow, Albert, Arthur E. Bragg, and Daniel M. Neumark. "Femtosecond time-resolved photoelectron spectroscopy." Chemical reviews 104.4 (2004): 1719-1758.
Wagadarikar, Ashwin, et al., "Single disperser design for coded aperture snapshot spectral imaging." Applied optics 47.10 (2008): B44-B51.
Wakin, Michael B., et al., "An architecture for compressive imaging." 2006 International Conference on Image Processing. IEEE, 2006 (4 pages).
Wallace, Gregory K. "The JPEG still picture compression standard." IEEE transactions on consumer electronics 38.1 (1992): xviii-xxxiv.

* cited by examiner

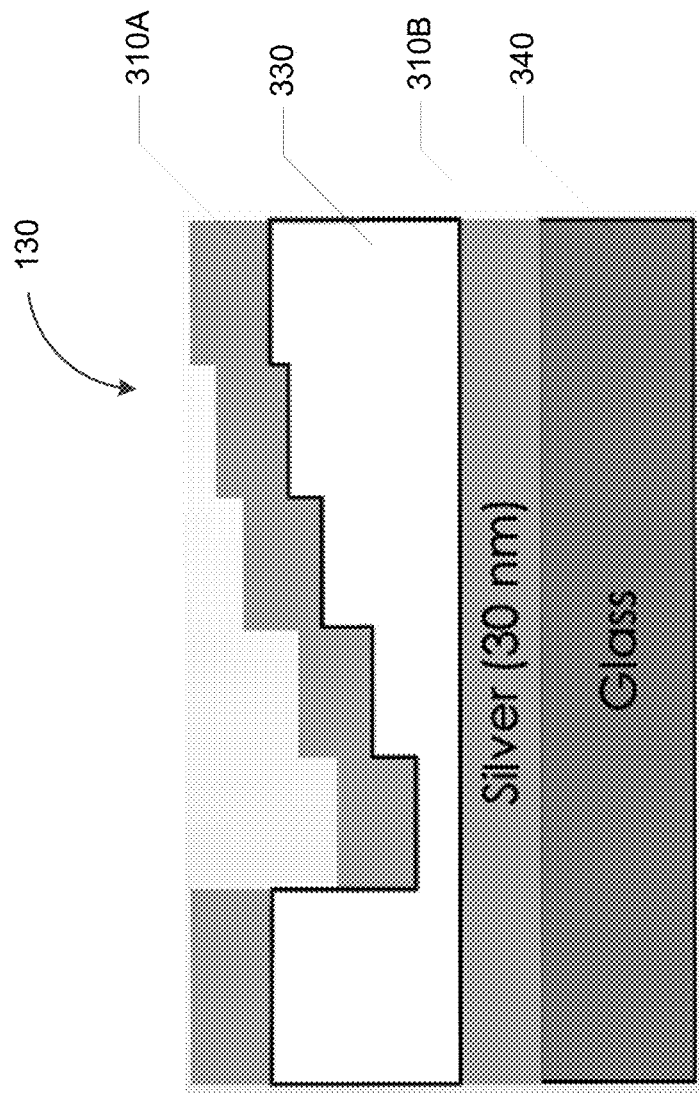

FILTER ARRAY BASED ULTRAFAST COMPRESSIVE IMAGE SENSOR

RELATED APPLICATION

This application claims priority to U.S. Provisional Patent Application No. 62/374,652 file on Aug. 12, 2016 and entitled SINGLE PHOTON LEVEL COMPRESSIVE SENSING BASED ON ULTRAFAST IMAGING TECHNOLOGY, the disclosure of which is incorporated herein by reference in its entirety.

TECHNICAL FIELD

The subject matter disclosed herein relates generally to imaging and more specifically to a filter array based compressive image sensor.

BACKGROUND

Microscopy refers to various techniques for viewing objects that are not within the resolution range of the human eye. For example, an optical microscope may use a light source and a system of lenses to magnify an object that is otherwise invisible to the human eye. The object may be illuminated with light from the light source. Meanwhile, the resulting light that scatters from the surface of the object may manipulated by the set of lenses to form an enlarged image of the object. The enlarged image may be output and viewed directly such as, for example, on a screen and/or through an eyepiece on the optical microscope. Alternatively and/or additionally, the enlarged image may be captured by a camera to generate, for example, a micrograph of the object.

SUMMARY

Apparatuses and methods are provided for filter array based compressive image sensing. The apparatus for filter array based compressive image sensing may include a filter array, a detector, and a reconstruction engine. The filter array may be configured to generate a first illumination pattern in response to a first wavelength of light and generate a second illumination pattern in response to a second wavelength of light. The first illumination pattern and the second illumination pattern may be projected onto an object. The detector may be configured to determine a first intensity of a first light emitted by the object in response to the first illumination pattern and determine a second intensity of a second light emitted by the object in response to the second illumination pattern. The reconstruction engine may include at least one data processor and at least one memory. The at least one memory may store instructions which, when executed by the at least one data processor, cause the reconstruction engine to at least generate an image of the object. The image of the object may be generated based at least on the first intensity, the first illumination pattern, the second intensity, and the second illumination pattern.

In some variations, one or more features disclosed herein including the following features can optionally be included in any feasible combination. The filter array, the detector, and the reconstruction engine may be configured to generate a first image depicting a position of a plurality of probing particles at a first time and generate a second image depicting a position of the plurality of probing particles at a second time. The reconstruction engine may be configured to generate, based at least on the first image and the second image, a composite image of a specimen and the plurality of probing particles being suspended in a medium. The plurality of probing particles may be configured to move in the medium surrounding the specimen. At least a portion of the plurality of probing particles may be configured to attach to a surface of the specimen.

In some variations, the first illumination pattern may illuminate one or more different portions of the object than the second illumination pattern.

In some variations, the reconstruction engine may be further configured to determine, based at least on an intensity of a region in the composite image, a chemical composition of the specimen. The intensity of the region may correspond to a length of time one or more probing particles are attached to a corresponding location on the surface of the specimen.

In some variations, the reconstruction engine may be configured to determine, based at least on the composite image, a surface geometry of the specimen, the composite image indicating a boundary of a negative space around the specimen.

In some variations, the filter array may include a first etalon and a second etalon. The first etalon and the second etalon may be configured with different passbands. The first etalon may be formed from a first pair of reflective surfaces. The first pair of reflective surfaces may be separated by a first distance corresponding to a first passband of the first etalon. The second etalon may be formed from a second pair of reflective surfaces. The second pair of reflective surfaces may be separated by a second distance corresponding to a second passband of the second etalon. The first pair of reflective surfaces and/or the second pair of reflective surfaces may be formed from one or more of a metallic film and/or a dielectric multilayer stack.

In some variations, the apparatus may further include a light source configured to generate a multi-wavelength light that includes the first wavelength of light and the second wavelength of light. The light source may be a laser configured to deliver one or more pulses of the multi-wavelength light.

In some variations, the apparatus may further include a dispersive medium. The dispersive medium may be a frequency-sweeping device including one or more prisms, optical fibers, diffractive gratings, and/or mirrors. The dispersive medium may be disposed between the light source and the filter array. The dispersive medium may be configured to at least separate the multi-frequency light exiting the light source into the first frequency of light and the second frequency of light.

In some variations, the dispersive medium may be disposed between the filter array and the detector. The dispersive medium may be configured to separate an output of the filter array into the first illumination pattern corresponding to the first frequency of light and the second illumination pattern corresponding to the second frequency of light.

In some variations, the detector may be a charge-coupled device (CCD) sensor, a complementary metal-oxide semiconductor (CMOS) sensor, a thermal sensor, a photodiode, an avalanche photo detector (APD), and/or a photomultiplier tube (PMT).

A method for filter array based compressive sensing may include: generating, in response to a first wavelength of light, a first illumination pattern; generating, in response to a second wavelength of light, a second illumination pattern; projecting, onto an object, the first illumination pattern and the second illumination pattern, the object comprising the specimen and the plurality of probing particles suspended in the medium; determining a first intensity of a first light emitted by the object in response to the first illumination pattern; and determining a second intensity of a second light emitted by the object in response to the second illumination pattern; and generating a first image of the object based at least on the first intensity, the first illumination pattern, the second intensity, and the second illumination pattern.

In some variations, the object may be a specimen and a plurality of probing particles suspended in a medium. The plurality of probing particles may be configured to move in the medium surrounding the specimen. At least a portion of the plurality of probing particles may be configured to attach to a surface of the specimen. The first image may depict a position of the plurality of probing particles at a first time.

In some variations, a second image of the object may be generated. The second image may depict a position of the plurality of probing particles at a second time. A composite image may be generated based at least on the first image and the second image. The generation of the composite image may include combining data from the first image and the second image to form a heat map and/or a vector map. A surface geometry of the specimen may be determined based at least on the composite image. The composite image may indicate a boundary of a negative space around the specimen. A chemical composition of the specimen may be determined based at least on an intensity of a region in the composite image. The intensity of the region may correspond to a length of time one or more probing particles are attached to a corresponding location on the surface of the specimen.

In some variations, a chemical composition of the specimen may be determined based at least on an intensity of a region in the composite image. The intensity of the region may correspond to a length of time one or more probing particles are attached to a corresponding location on the surface of the specimen.

In some variations, a surface geometry of the specimen may be determined based on at least on the composite image. The composite image may indicate a boundary of a negative space around the specimen.

In some variations, the composite image may be generated by at least combining data from the first image and the second image to form a heat map and/or a vector map.

In some variations, the first image and/or the second image may be generated by at least: generating, in response to a first wavelength of light, a first illumination pattern; generating, in response to a second wavelength of light, a second illumination pattern; projecting, onto an object, the first illumination pattern and the second illumination pattern, the object comprising the specimen and the plurality of probing particles suspended in the medium; determining a first intensity of a first light emitted by the object in response to the first illumination pattern; determining a second intensity of a second light emitted by the object in response to the second illumination pattern; and generating an image of the object based at least on the first intensity, the first illumination pattern, the second intensity, and the second illumination pattern. The multi-wavelength light including the first wavelength of light and the second wavelength of light may be generated. The multi-wavelength light may be separated into the first wavelength of light and the second wavelength of light.

The details of one or more variations of the subject matter described herein are set forth in the accompanying drawings and the description below. Other features and advantages of the subject matter described herein will be apparent from the description and drawings, and from the claims. While certain features of the currently disclosed subject matter are described for illustrative purposes in relation to an enterprise resource software system or other business software solution or architecture, it should be readily understood that such features are not intended to be limiting. The claims that follow this disclosure are intended to define the scope of the protected subject matter.

BRIEF DESCRIPTION OF THE DRAWINGS

The accompanying drawings, which are incorporated in and constitute a part of this specification, show certain aspects of the subject matter disclosed herein and, together with the description, help explain some of the principles associated with the subject matter disclosed herein. In the drawings.

FIG. 3C depicts a cross section view of a filter array, in accordance with some example embodiments;

When practical, similar reference numbers denote similar structures, features, or elements.

DETAILED DESCRIPTION

A conventional optical microscope does not have sufficient resolution for viewing miniscule objects such as, for example, nanoscale structures. Meanwhile, a conventional camera has a limited frame rate and is therefore unable to capture ephemeral phenomena such as, for example, motion that transpire within sub-microsecond and/or nanoseconds. In some example embodiments, a compressive image sensor may overcome these and other limitations of a conventional optical camera. For example, the compressive image sensor may include a filter array that is capable of projecting, at an ultrafast speed, a series of illumination patterns onto an object. The compressive image sensor may further include a detector configured to measure the intensity of the light emitted by the object in response to each illumination pattern. An image of the object may be reconstructed based on the illumination patterns and the corresponding intensity measurements.

A specimen, such as, for example, a three-dimensional nanostructure and/or the like, may exhibit a highly complex surface geometry and chemical composition. In some example embodiments, in order to determine the surface geometry and/or the chemical composition of the specimen, the specimen may be suspended in a liquid and/or a gaseous medium along with one or more probing particles. The probing particles may be fluorescent molecules that exhibit Brownian motion when suspended in the medium. That is, these probing particles may be able to move throughout the medium surrounding the specimen. Furthermore, each probing particle may attach to a location on the surface of the specimen and remain fixed in that location for a length of time that is dependent on the chemical composition of the specimen at that location.

Meanwhile, the compressive image sensor may be used to capture the ultrafast Brownian motion of the probing particles. For example, the compressive image sensor may capture a series of images depicting the positions of the probing particles as the probing particles move rapidly throughout negative space surrounding the specimen and/or dwell upon the surface of the specimen. These images may be used to determine the surface geometry of the specimen because the different positions of the probing particles may indicate the boundaries of the negative space surrounding the specimen. Furthermore, the intensities of the light captured in the images may correspond to the length of time the particles remain in a fixed location on the surface of the specimen. As noted, the length of time a particle remains fixed in a location on the surface of the specimen may depend on the chemical composition of the specimen at that location. Accordingly, the chemical composition of the specimen may also be determined based on the different intensities light shown in the series of images captured by the compressive image sensor.

Figure 1A:
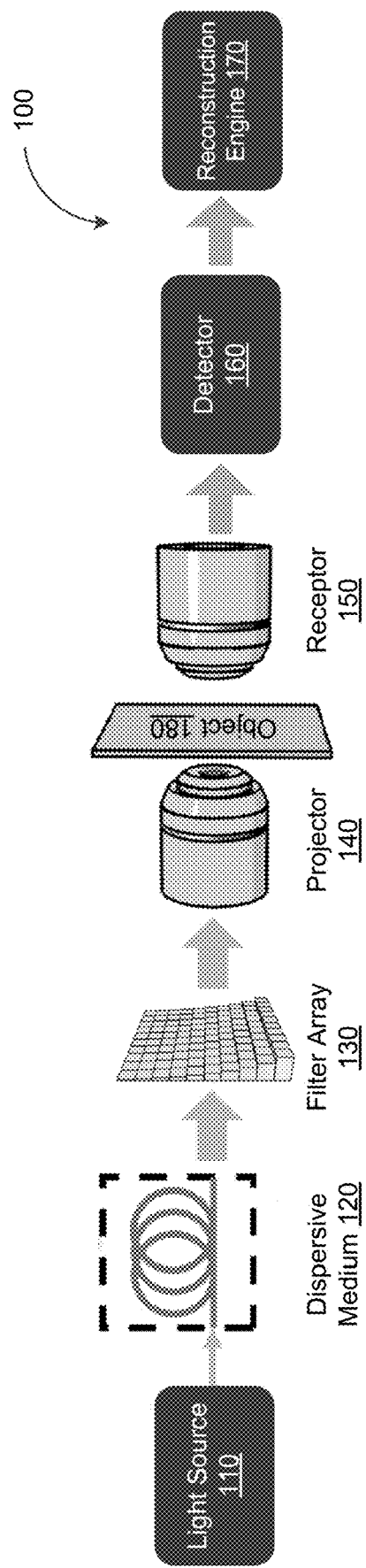
FIG. 1A depicts a compressive image sensor, in accordance with some example embodiments.

FIG. 1A depicts a compressive image sensor 100, in accordance with some example embodiments. Referring to FIG. 1A, the compressive image sensor 100 may include a light source 110, a dispersive medium 120, a filter array 130, a projector 140, a receptor 150, a detector 160, and a reconstruction engine 170.

The light source 110 may be any light source capable of delivering multiple wavelengths of light. For instance, in some example embodiments, the light source 110 may be a broadband pulse laser configured to deliver pulses of visible white light, which includes all of the wavelengths or colors of light in the visible portion of the electromagnetic spectrum (e.g., between 390 nanometers to 700 nanometers). Meanwhile, the dispersive medium 120 may be configured to disperse or separate the light from the light source 110 into its component wavelengths or colors. For example, the dispersive medium 120 may separate white light from the light source 110 into red light, orange light, yellow light, green light, blue light, violet light, and/or the like. It should be appreciated that the dispersive medium 120 may include any dispersive mechanism including, for example, prism, optical fiber, diffraction gratings, mirrors, and/or the like. Alternatively and/or additionally, the light source 110 and/or the dispersive medium 120 may be implemented using a frequency-tunable device, such as, for example, a tunable laser, a monochromator, a frequency scanning mirror, and/or the like.

In some example embodiments, the filter array 130 may generate a different illumination pattern for each wavelength of light output by the dispersive medium 120. The filter array 130 may include a plurality of filters, such as, for example, etalons and/or the like, that are each configured with a specific passband. When different wavelengths of light pass through the filter array, the wavelengths of light that are outside of the passband of a filter may be attenuated by the filter. Meanwhile, those wavelengths of light that are within the passband of the filter are allowed to pass through the filter unchanged. Accordingly, different wavelengths of incoming light may trigger different responses from the same filter. Furthermore, because each filter in the filter array may be configured with a different passband, different filters in the filter array may also respond differently to the same wavelength of incoming light. As such, the filter array 130 may output a unique illumination pattern for each wavelength of light that passes through the filter array 130.

Referring again to FIG. 1A, the projector 140 and/or the receptor 150 may include a system of lens and/or mirrors configured to gather light from and/or focus light onto a target of the compressive image sensor 100 such as, for example, an object 180. In some example embodiments, the projector 140 may be configured to project, onto the object 180, the illumination patterns output by the filter array 130. Meanwhile, the receptor 150 may be configured to collect the light emitted by the object 180 in response to each illumination pattern. It should be appreciated that each illumination pattern may illuminate one or more different portions of the object 180. For example, an illumination pattern may cast light onto some but not all portions of the object 180. Alternatively and/or additionally, an illumination pattern may cast a higher intensity light onto some portions of the object 180 and a lower intensity light onto other portions of the object 180.

Figure 2:
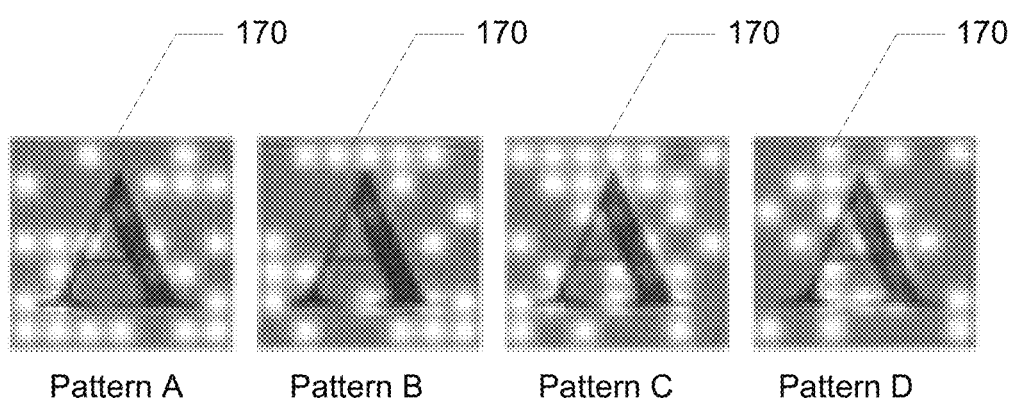
FIG. 2 depicts different illumination patterns, in accordance with some example embodiments.

To further illustrate, FIG. 2 depicts examples of different illumination patterns that may be output by the filter array 130 and projected onto the object 180 by the projector 140. As shown in FIG. 2, Pattern A, Pattern B, Pattern C, and Pattern D may each illuminate different portions of the object 180. According to some example embodiments, the filter array 130 may output a different illumination pattern in response to each wavelength or color of light that passes through the filter array 130. For example, the filter array 130 may output Pattern A when red light having a wavelength of 650 nanometers passes through the filter array 130. Alternatively and/or additionally, the filter array 130 may output Pattern B when blue light having a wavelength of 475 nanometers passes through the filter array 130. Pattern C may be output by the filter array 130 when yellow light having a wavelength of 570 nanometers passes through the filter array 130 while Pattern D may be output by the filter array 130 when green light having a wavelength of 510 nanometers passes through the filter array 130. It should be appreciated that the receptor 150 may be configured to collect the light that is emitted by the object 180 in response to each illumination pattern that is projected onto the object 180.

The detector 160 may be configured to determine, based on the light collected by the receptor 150, an intensity of the light that is emitted by the object 180 in response to each illumination pattern projected onto the object 180 by the projector 140. It should be appreciated that the detector 160 may include any mechanism for measuring the intensity of light. For instance, the detector 160 may include one or more detectors including, for example, charge-coupled device (CCD) sensors, complementary metal-oxide semiconductor (CMOS) sensors, thermal sensors, photodiodes, avalanche photo detectors (APD), photomultiplier tubes (PMT), and/or the like.

The reconstruction engine 170 may be configured to generate an image of the object 180 based on the different illumination patterns and the corresponding intensity measurements determined by the detector 160. For example, the reconstruction engine 117 may generate the image by at least applying a compressive sensing reconstruction technique, such as, for example, $l_1$ minimization, iterative thresholding, model based reconstruction, and/or the like. Table 1 below includes pseudo programming code implementing a compressive sensing reconstruction algorithm.

TABLE 1

// Calibration
Get A; // A is the matrix that contains the projected pattern of the etalon array at each time
// Measurement
Measure y; // y is the sequence of intensities measured by the sensor during the pattern projection
// Image reconstruction
Set x; // x is the initial guess of the image
Do until x fits the observed data:
    Calculate expected measurement A*x;
    If A*x does not fit the observed measurement y:
        Calculate reconstruction metric
        Adjust x using reconstruction metric
Loop For example, the reconstruction engine 170 may generate the image of the object 180 based on Pattern A and intensity of light emitted by the object 180 in response to Pattern A, Pattern B and the intensity of light emitted by the object 180 in response to Pattern B, Pattern C and the intensity of light emitted by the object 180 in response to Pattern C, and/or Pattern D and the intensity of the light emitted by the object 180 in response to Pattern D. In some example embodiments, the reconstruction engine 170 may further generate, based on a series of images of the object 180, a composite image depicting a surface geometry of the object 180. The image and/or the composite image may be saved and/or output in any manner including, for example, displayed on a screen, printed as a micrograph, and/or the like.

Figure 1B:
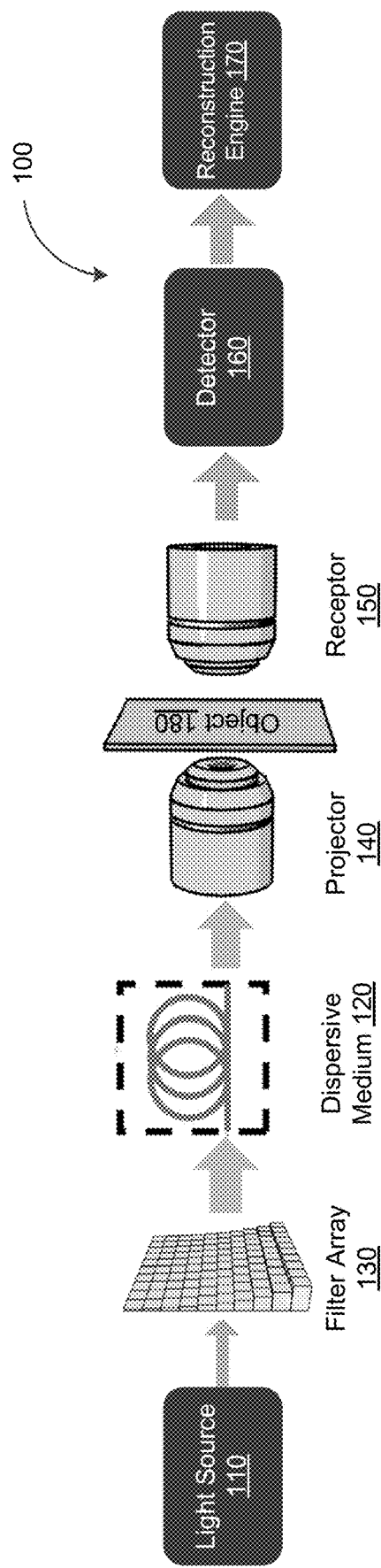
FIG. 1B depicts an alternative configuration for a compressive image sensor, in accordance with some example embodiments.

FIG. 1B depicts an alternative configuration for the compressive image sensor 100, in accordance with some example embodiments. As shown in FIG. 1B, the filter array 130 may be disposed before the dispersive medium 120. In this particular configuration, multi-wavelength light (e.g., white light) output by the light source 110 may enter the filter array 130 directly and generate a composite illumination pattern. The dispersive medium 120 may subsequently separate this composite illumination pattern into a series of component illumination patterns that each correspond to a different wavelength or color from the multi-wavelength light. Meanwhile, the projector 140 may project the different illumination patterns onto the object 180 and the receptor 150 may collect the light emitted by the object 180 in response to each illumination pattern. As noted, the detector 160 may determine, based on the light collected by the receptor 150, the intensity of the light emitted by the object 180 in response to each illumination pattern. The detector 160 may further generate an image of the object 180 based on the different illumination patterns and the corresponding intensity measurements.

It should be appreciated that the compressive image sensor 100 may be capable of capturing images of miniscule objects including, for example, nanoscale structures such as probing particles. Furthermore, the illumination pattern output by the filter array 130 may change rapidly, which lends to the ultrafast frame rate (e.g., 25 kilohertz (kHz)) of the compressive image sensor 100. Thus, as noted, the compressive image sensor 100 may be able to capture ephemeral phenomena that transpire over a short period of time (e.g., sub-microseconds and/or nanoseconds). For instance, according to some example embodiments, the compressive image sensor 100 may be used to capture the rapid Brownian movement of probing particles through a medium surrounding a specimen. The compressive image sensor 100 may capture a series of images depicting the positions of the probing particles as the probing particles move throughout the negative space surrounding the specimen. As noted, the surface geometry of the specimen may be determined based on these images, which may delineate the surface contours of the specimen by at least indicating the boundaries of the negative space surrounding the specimen.

Figure 3A:
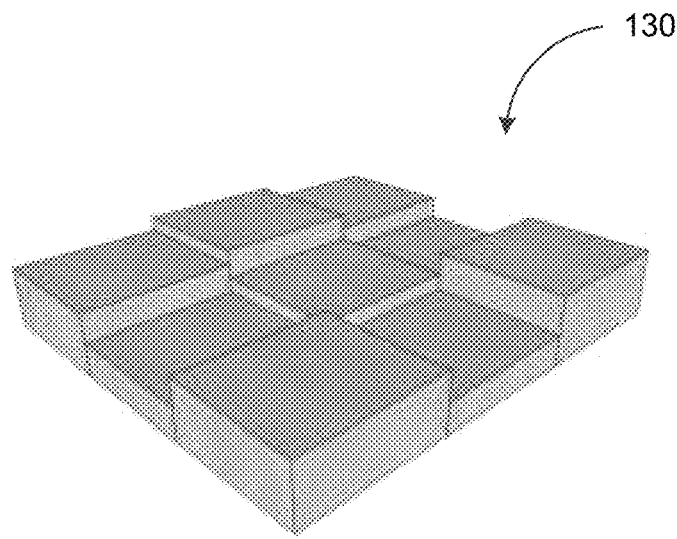
FIG. 3A depicts a perspective view of at least a portion of a filter array, in accordance with some example embodiments.

FIG. 3A depicts a perspective view of at least a portion of the filter array 130, in accordance with some example embodiments. Referring to FIG. 3A, the filter array 130 may include filters of varying thickness. As noted, each filter in the filter array 130 may be configured with a different passband. It should be appreciated that the passband of a filter may correspond to the thickness of the filter. To further illustrate, FIG. 3B depicts a first filter 310A and a second filter 310B from the filter array 130, in accordance with some example embodiments.

Figure 3B:
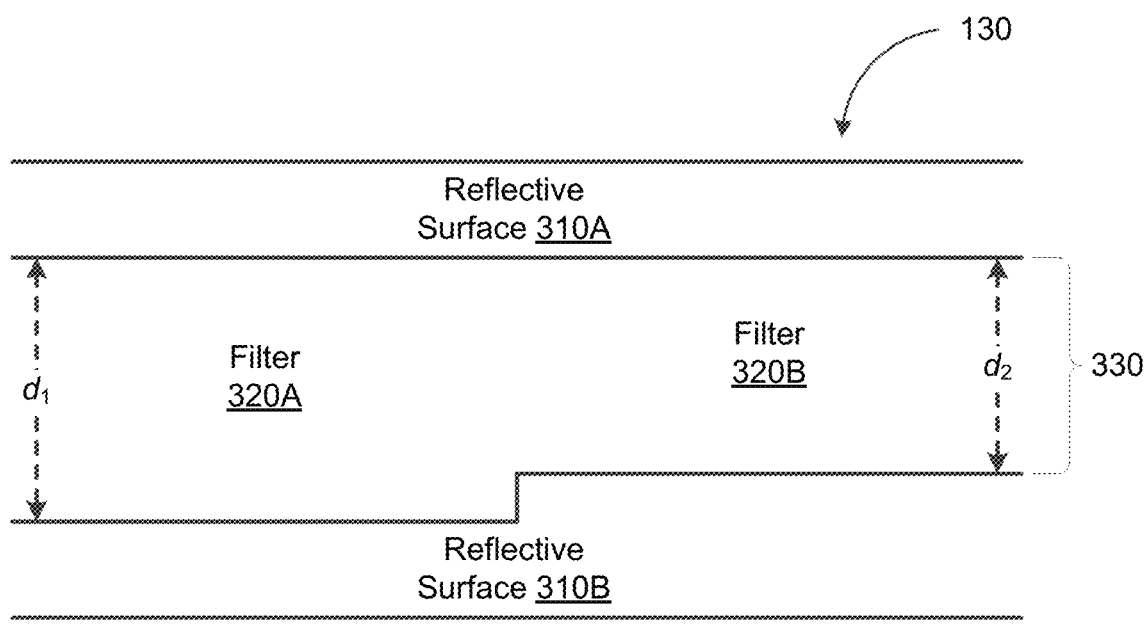
FIG. 3B depicts a cross section view of a first filter and a second filter in a filter array, in accordance with some example embodiments.

As shown in FIG. 3B, the first filter 320A and/or the second filter 320B may be etalons formed from a first reflective surface 310A and a second reflective surface 310B. The first reflective surface 310A and the second reflective surface 310B may be separated by an optically transparent medium 330. In some example embodiments, the reflective surfaces forming the first filter 162 and/or the second filter 164 may be partially reflective. For instance, the first reflective surface 310A and the second reflective surface 310B may be associated with a reflectivity R, which may correspond to a portion of the incoming light that is reflected and/or allowed to pass through the first reflective surface 310A and the second reflective surface 310B. Furthermore, the first filter 320A may have a different thickness than the second filter 320B. For instance, the first reflective surface 310A and the second reflective surface 310B may be separated by a first distance $d_1$ at the first filter 320A whereas the first reflective surface 310A and the second reflective surface 310B may be separated by a second distance $d_2$ at the second filter 320B.

The passband T of a filter may be determined by Equation (1) and Equation (2) below. It should be appreciated that the difference in thickness between the first filter 320A and the second filter 320B may result in the first filter 320A having a different passband than the second filter 320B. Alternatively and/or additionally, the passband of the first filter 320A and the second filter 320B may also differ due to variations in the reflectivity R of the first reflective surface 310A and/or the second reflective surface 310B at the first filter 320A and the second filter 320B.

$$T = \frac{(1-R)^2}{1+R^2 - 2R\cos\delta} \quad (1)$$

$$\delta = \left(\frac{2\pi}{\lambda}\right) 2dn \quad (2)$$

wherein λ may be the wavelength of the incoming light passing through the first filter 320A and/or the second filter 320B, δ may be phase difference between successive waves of light exiting from the first filter 320A and/or the second filter 320B, and n may be the refractive index of the optically transparent medium 330.

FIG. 3C depicts a cross section view of the filter array 130, in accordance with some example embodiments. According to some example embodiments, the first reflective surface 310A and/or the second reflective surface 310B may be formed from one or more dielectric multilayer stacks and/or metallic films including, for example, silver (Ag), gold (Au), aluminum (Al), and/or the like. Furthermore, as shown in FIG. 3C, the first reflective surface 310A and/or the second reflective surface 310B may have a thickness of 30 nanometers (nm) and/or optimized different thickness. Meanwhile, the optically transparent medium 330 may be formed, for example, from a few micrometers thick layer of silicon dioxide ($SiO_2$).

In some example embodiments, the first filter 162 and/or the second filter 164 may be a part of an N×M filter array, where N and M may be any arbitrary number. To form this N×M filter array, the second reflective layer 310B may be formed by depositing, on the surface of a substrate 340, a reflective material such as, for example, a metallic film. As noted, the metallic film may be a 30 nanometer layer of silver (Ag), aluminum (Al), and/or the like. Meanwhile, the substrate 340 may be, for example, glass. Any technique may be used to form the second reflective layer 310B including, for example, sputtering deposition and/or the like.

Referring again to FIG. 3C, after forming the second reflective layer 310B on the substrate 340, the optically transparent medium 330 may be deposited on the surface of the second reflective layer 310B. For instance, a 700 nanometer layer of silicon dioxide ($SiO_2$) may be deposited, via plasma-enhanced chemical vapor deposition, over the metallic film to form the second reflective layer 310B. An N×M grid step structure may be formed from poly(methyl methacrylate) (PMMA) by at least spin-coating a 2.8 micron thick layer of poly(methyl methacrylate) on top of the optically transparent medium 330 and then depositing a 2.5 micron thick layer of conductive gold (Au) thereon. The resulting structure may be placed in an electron beam lithography machine and exposed to a varying electron beam dose, which may range from 1.4 to 80 micro-Colombes per square centimeter ($\mu C/cm^2$) at an energy of 10 kiloelectronvolt (keV). The gold (Au) may be subsequently removed using a potassium iodide (KI) etchant while the poly(methyl methacrylate) may be developed by submerging the poly(methyl methacrylate) grid structure in a solution of methyl isobutyl ketone (MIBK) for 5 minutes and rinsing with isopropyl alcohol for 30 seconds. This may result in an N×M array of recesses (e.g., within the poly(methyl methacrylate)) that range in depth from 20 nanometers to 2 microns. Here, the poly(methyl methacrylate) grid structure may be dried under nitrogen gas ($N_2$) and finished with another layer of metallic film to form the first reflective layer 310A. For example, a 30 nanometer layer of silver (Ag), aluminum (Al), and/or the like may be applied, via sputter deposition, over the optically transparent medium 330 to form the first reflective layer 310A. To prevent oxidation of the first reflective layer 310A, an additional layer of silicon dioxide ($SiO_2$) may be applied over the metallic film forming the first reflective surface 310A. The resulting N×M filter array may include filters (e.g., etalons) that range in thickness between 1.5 microns to 3.5 microns.

Figure 4A:
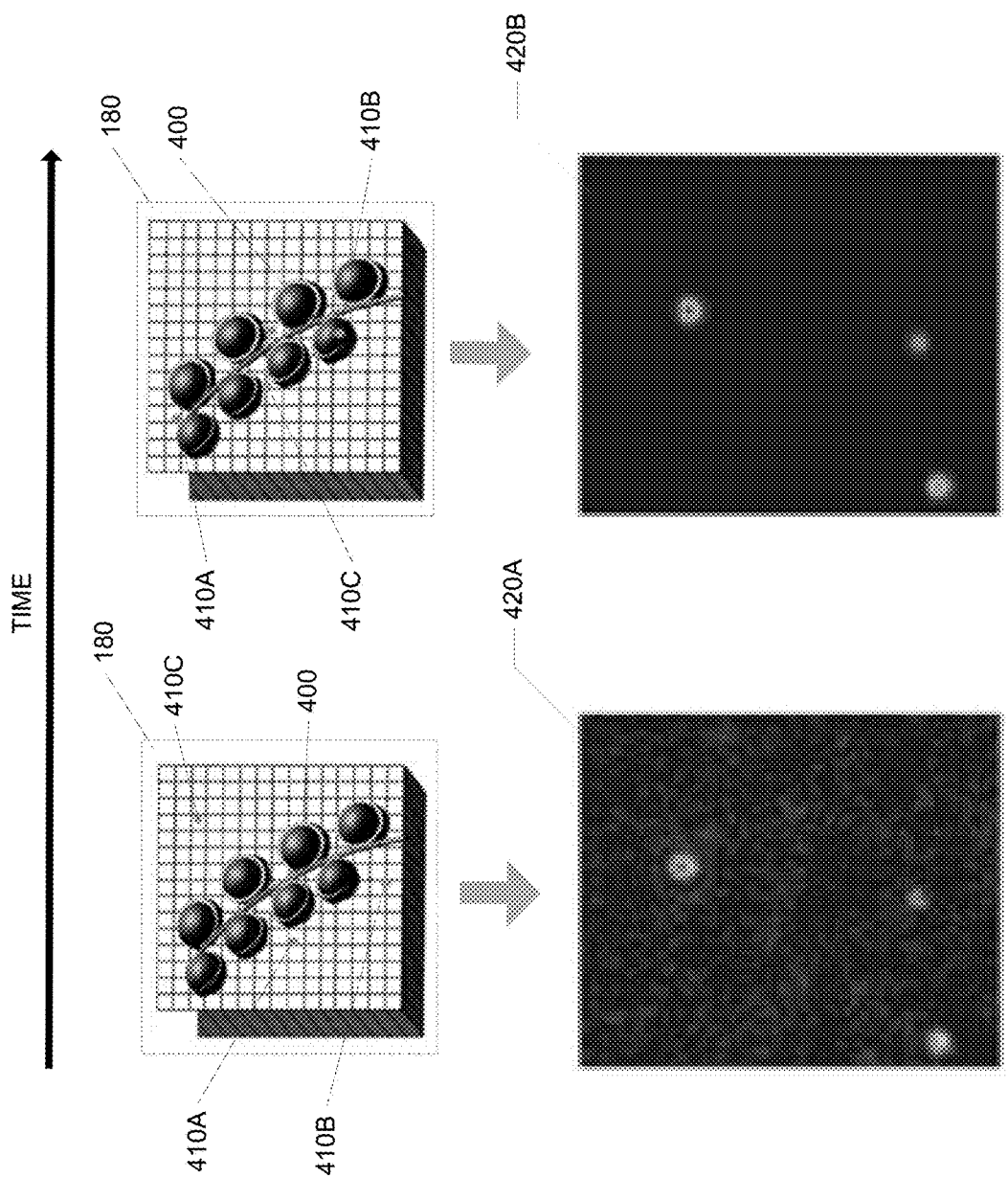
FIG. 4A depicts a series of images illustrating the movement of probing particles around a specimen, in accordance with some example embodiments.

As noted, in some example embodiments, the compressive image sensor 100 may be used to capture images that may be used to determine the surface geometry of a specimen. For instance, the specimen may be a three-dimensional nanostructure, such as, for example, chromatins and/or the like. To further illustrate, FIG. 4A depicts a series of images illustrating the movement probing particles around a specimen 400, in accordance with some example embodiments. In some example embodiments, the compressive image sensor 100 may capture images of the specimen 400 while the specimen 400 is suspended in a medium (e.g., liquid and/or gas) along with a plurality of probing particles including, for example, a first probing particle 410A, a second probing particle 410B, and/or a third probing particle 410C. When suspended in the medium, the first probing particle 410A, the second probing particle 410B, and/or the third probing particle 410C may exhibit Brownian motion and move rapidly in the medium surrounding the specimen 400. Alternatively and/or additionally, the first probing particle 410A, the second probing particle 410B, and/or the third probing particle 410C may attach to the surface of the specimen 400 and remain in a fixed location as a result of chemical interactions with the specimen 400. The length of time a probing particle is attached to a fixed location on the surface of the specimen 400 may be dependent on the chemical composition of the specimen 400 at that location. For instance, the chemical composition of the specimen 400 may vary across the specimen 400. As such, the length of time during which the first probing particle 410A, the second probing particle 410B, and/or the third probing particle 410C remain attached the specimen 400 may differ depending on the chemical composition of the portion of the specimen 400 where the first probing particle 410A, the second probing particle 410B, and/or the third probing particle 410C are attached.

It should be appreciated that the first probing particle 410A, the second probing particle 410B, and/or the third probing particle 410C may be any type of fluorescent particle (e.g., fluorophore) that is capable of moving rapidly around medium and/or attaching to the surface of the specimen 400. For example, the first probing particle 410A, the second probing particle 410B, and/or the third probing particle 410C may be molecular fluorescent dyes (e.g. Rhodamine, Cyanine, Oxazine, and/or the like), fluorescent proteins, fluorescent beads, inorganic fluorescent materials, fluorescent metal clusters, nitrogen vacancy centers in diamond, quantum dots, and/or the like.

In some example embodiments, the compressive image sensor 100 capture a series of images including, for example, a first image 420A and a second image 420B. It should be appreciated that the medium containing the specimen 400, the first probing particle 410A, the second probing particle 410B, and the third probing particle 410C may form the object 180 that is the target of the compressive image sensor 100. Thus, as noted, the compressive image sensor 100 may capture the first image 420A and/or the second image 420B by projecting, onto the object 180, different illumination patterns, such as, for example, Pattern A, Pattern B, Pattern C, and/or Pattern D. The compressive image sensor 100 may further measure the intensity of light that is emitted by the object 180 in response to each illumination pattern. The first image 420A and/or the second image 420B may be generated based on the illumination patterns and the corresponding intensity of light that is emitted by the object 180.

Referring again to FIG. 4A, the compressive image sensor 100 may capture the first image 420A at a first time $t_1$ before capturing the second image 420B at a second time $t_2$. The first image 420A may depict the positions of the first probing particle 410A, the second probing particle 410B, and/or the third probing particle 410C in the negative space surrounding the specimen 400 at the first time $t_1$. Meanwhile, the second image 420B may depict the positions of the first probing particle 410A, the second probing particle 410B, and/or the third probing particle 410C in the negative space surrounding the specimen 400 at the second time $t_2$.

Figure 4B:
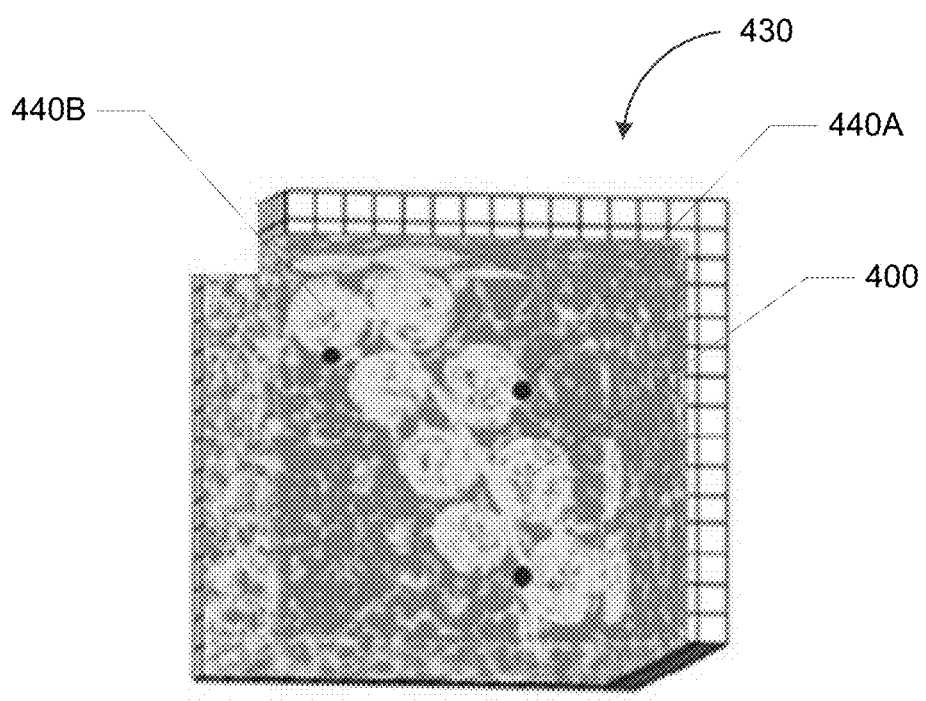
FIG. 4B depicts a composite image illustrating a surface geometry and a chemical composition of a specimen, in accordance with some example embodiments.

In some example embodiments, the surface geometry and/or the chemical composition of the specimen 400 may be determined based on the first image 420A and the second image 420B. For instance, FIG. 4B depicts a composite image 430 illustrating the surface geometry and the chemical composition of the specimen 400, in accordance with some example embodiments. Referring to FIG. 4B, the composite image 430 may be a composite of at least the first image 420A and the second image 420B. For example, generating the composite image 430 may including combining data from the first image 420A and the second image 420B including, for example, the positions of the first probing particle 410A, the second probing particle 410B, and/or the third probing particle 410C at the first time $t_1$ and at the second time $t_2$. The resulting composite image 430 may be a heat map showing the different positions of the probing particles over time. Alternatively and/or additionally, data from the first image 420A and/or the second image 420B may be processed to generate a vector map depicting other metrics with respect to the probing particles including, for example, velocities, a standard deviation of velocity, acceleration, collision frequency, and/or the like.

In some example embodiments, the composite image 430 may show the surface contours of the specimen 400 by at least indicating the boundaries of the negative space surrounding the specimen 400. Alternatively and/or additionally, the composite image 430 may show one or more intensities of light that correspond to the chemical composition of the specimen 400. As noted, the length of time a probing particle remains attached to a fixed location on the surface of the specimen 400 may depend on the chemical composition of the specimen 400 at that location. The longer a probing particle remains in a fixed location, the more images may be captured of that probing particle in that fixed location. Meanwhile, the lengths of time different probing particles remain attached to various locations on the specimen 400 may be reflected as areas of different intensities in the resulting composite image. For instance, areas of higher intensities may correspond to locations on the specimen 400 where one or more probing particles have remained attached for relatively longer lengths of time while areas of lower intensities may correspond to locations on the specimen 400 where one or more probing particles have remained attached for relatively shorter lengths of time.

To further illustrate, the composite image 430 may include one or more areas of different intensities including, for example, a first region 440A and a second region 440B. The first region 440A may be an area of high intensity corresponding to a location on the specimen 400 where one or more probing particles have remained attached for relatively longer lengths of time. By contrast, the second region 440B may be an area of low intensity corresponding to a location on the specimen 400 where one or more probing particles have remained attached for relatively shorter lengths of time. As noted, the length of time a probing particle remains attached to the specimen 400 may depend on the chemical composition of the specimen 400. For example, this difference in intensities between the first region 440A and the second region 440B may indicate a difference in the chemical composition of the specimen 400 at these locations. Furthermore, the respective intensities of the first region 440A and the second region 440B may be indicative of the chemical composition of the specimen 400 at the corresponding locations.

Figure 5A:
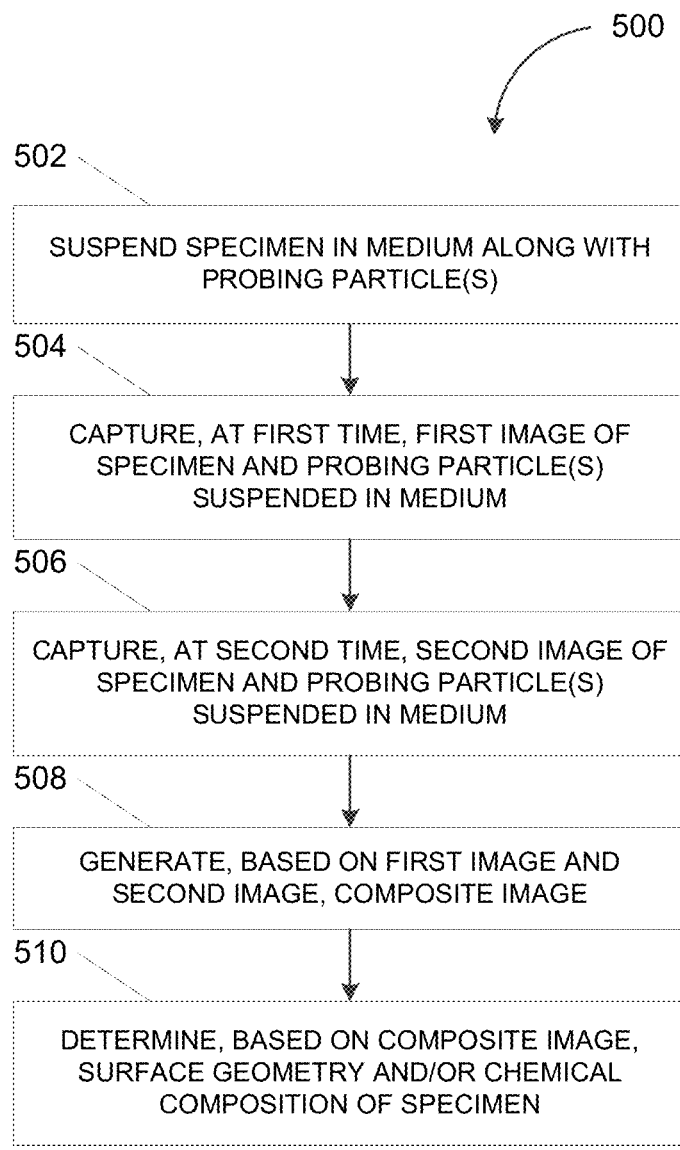
FIG. 5A depicts a flowchart illustrating a process for compressive image sensing, in accordance with some example embodiments.

FIG. 5A depicts a flowchart illustrating a process 500 for determining the surface geometry and/or a chemical composition of a specimen, in accordance with some example embodiments.

At 502, the specimen may be suspended in a medium along with one or more probing particles. For example, the specimen 400 may be suspended in a liquid medium and/or a gaseous medium along with the first probing particle 410A, the second probing particle 410B, and/or the third probing particle 410C.

At 504, a first image of the specimen and the probing particles suspended in the medium may be captured at a first time. For instance, the compressive image sensor 100 may be used to capture, at the first time $t_1$, the first image 420A. The first image 420A may depict the positions of the first probing particle 410A, the second probing particle 410B, and/or the third probing particle 410C in the negative space surrounding the specimen 400 at the first time $t_1$.

At 506, a second image of the specimen and the probing particles suspended in the medium may be captured at a second time. For example, the compressive image sensor 100 may further be used to capture the second image 420B at the second time $t_2$. The second image 420B may depict the positions of the first probing particle 410A, the second probing particle 410B, and/or the third probing particle 410C in the negative space surrounding the specimen 400 at the second time $t_2$.

At 508, a composite image may be generated based at least on the first image and the second image. For example, the composite image 430 may be generated based at least on the first image 420A and the second image 420B. In some example embodiments, the composite image 430 may be generated by combining and/or processing data from the first image 420A and/or the second image 420B. The composite image 430 may be a heat map showing the different positions of the probing particles over time. Alternatively and/or additionally, the composite image 430 may be a vector map depicting other metrics with respect to the probing particles including, for example, velocities, a standard deviation of velocity, acceleration, collision frequency, and/or the like.

At 510, the surface geometry and/or the chemical composition of the specimen may be determined based on the composite image. In some example embodiments, the composite image 430 may show the surface contours of the specimen 400 by at least indicating the boundaries of the negative space surrounding the specimen 400. Alternatively and/or additionally, the composite image 430 may show areas of different intensities. A high intensity area in the composite image 430, such as, for example, the first region 440A, may correspond to locations on the specimen 400 where one or more probing particles have remained attached for relatively longer lengths of time. Meanwhile, an area of low intensity, such as, for example, the second region 440B, may correspond to locations on the specimen 400 where one or more probing particles have remained attached for relatively shorter lengths of time. As noted, the length of time a probing particle remains attached to a fixed location on the surface of the specimen 400 may depend on the chemical composition of the specimen 400 at that location. Thus, the chemical composition of the specimen 400 may be determined based at least on the areas of different intensities shown in the composite image 430.

Figure 5B:
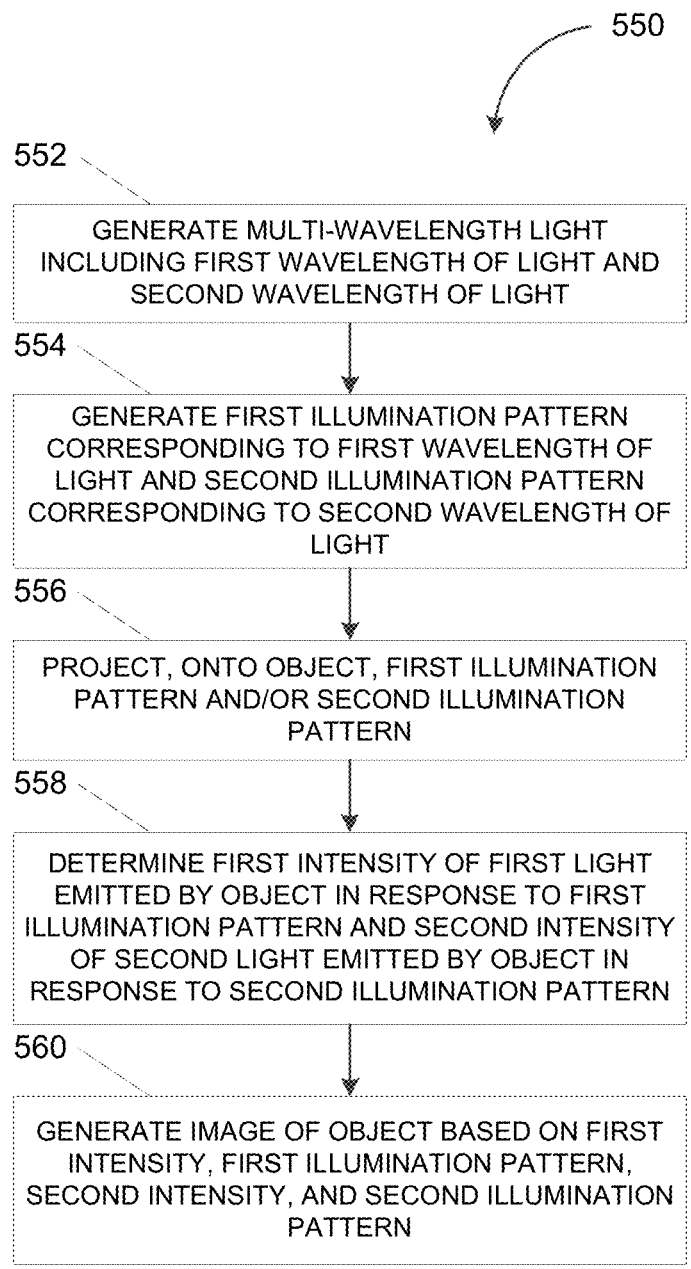
FIG. 5B depicts a flowchart illustrating a process for reconstructive spectrometry, in accordance with some example embodiments.

FIG. 5B depicts a flowchart illustrating a process 550 for compressive image sensing, in accordance with some example embodiments. Referring to FIGS. 1A-B, 2, 3A-B, 4A-B, and 5A-B, the process 500 may be performed by the compressive image sensor 100 and may implement operation 502 and/or operation 504 of the process 500.

At 552, the compressive image sensor 100 may generate a multi-wavelength light including a first wavelength of light and a second wavelength of light. For example, the light source 110 may generate pulses of visible white light, which may include all of the wavelengths or colors of light in the visible portion of the electromagnetic spectrum (e.g., between 390 nanometers to 700 nanometers).

At 554, the compressive image sensor 100 may generate a first illumination pattern corresponding to the first wavelength of light and a second illumination pattern corresponding to the second wavelength of light. In some example embodiments, the multi-wavelength light (e.g., white light) output by the light source 110 may pass through the dispersive medium 120 and the filter array 130. In doing so, the dispersive medium 120 and the filter array 130 may generate a different illumination pattern for each wavelength or color of light that is present in the multi-wavelength light. For example, the dispersive medium 120 and the filter array 130 may output Pattern A for red light having a wavelength of 650 nanometers, Pattern B for blue light having a wavelength of 475 nanometers, Pattern C for yellow light having a wavelength of 570 nanometers, and/or Pattern D for green light having a wavelength of 510 nanometers.

At 556, the compressive image sensor 100 may project, onto an object, the first illumination pattern and/or the second illumination pattern. For example, the projector 140 may project, onto the object 180, each illumination pattern.

At 558, the compressive image sensor 100 may determine a first intensity of a first light emitted by the object in response to the first illumination pattern and a second intensity of a second light emitted by the object in response to the second illumination pattern. For example, the receptor 150 may collect the light that is emitted by the object 180 in response to each illumination pattern. The detector 160 may further determine the intensity of the light that is emitted by the object 180 in response to each illumination pattern.

At 560, the compressive image sensor 100 may generate an image of the target object based at least on the first intensity, the first illumination pattern, the second intensity, and the second illumination pattern. In some example embodiments, the reconstruction engine 170 may generate an image of the object 180 (e.g., the first image 420A and/or the second image 420B) based on the different illumination patterns and the corresponding intensity measurements determined by the detector 160. Here, the reconstruction engine 170 may apply one or more compressive sensing reconstruction techniques including, for example, $l_1$ minimization, iterative thresholding, model based reconstruction, and/or the like. For example, the reconstruction engine 170 may generate the image of the object 180 based on Pattern A and intensity of light emitted by the object 180 in response to Pattern A, Pattern B and the intensity of light emitted by the object 180 in response to Pattern B, Pattern C and the intensity of light emitted by the object 180 in response to Pattern C, and/or Pattern D and the intensity of the light emitted by the object 180 in response to Pattern D.

Figure 6:
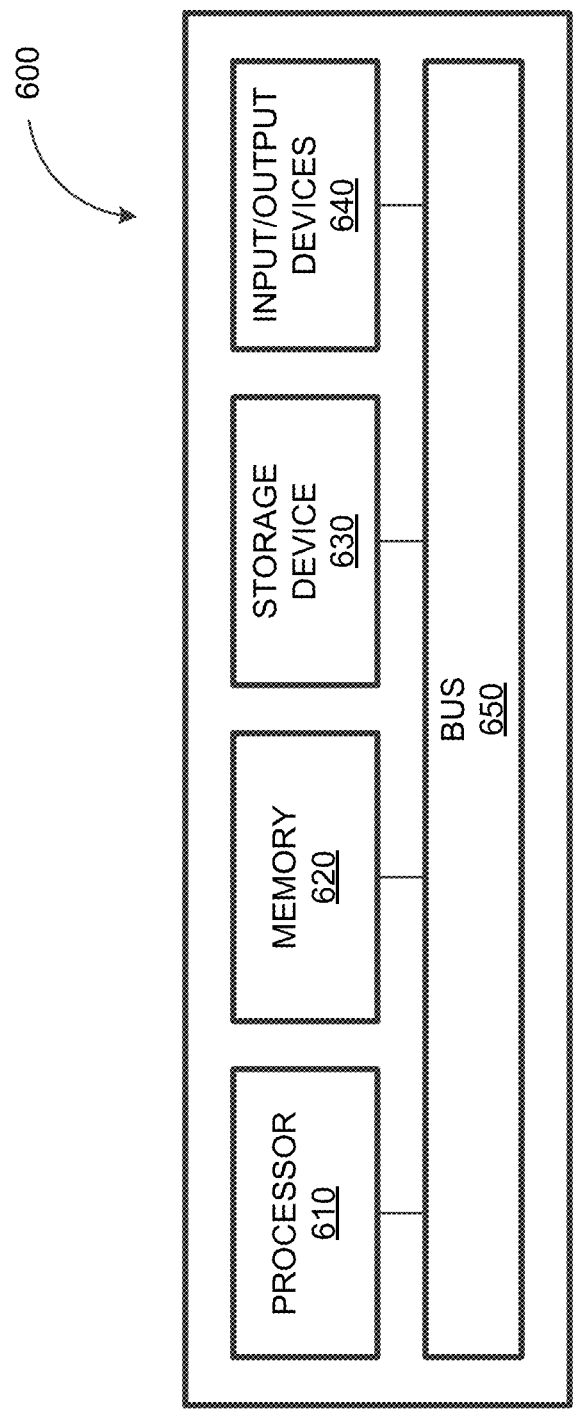
FIG. 6 depicts a block diagram illustrating a computing system consistent with implementations of the current subject matter.

FIG. 6 depicts a block diagram illustrating a computing system 600 consistent with implementations of the current subject matter. Referring to FIGS. 1-6, the computing system 600 can be used to implement the reconstruction engine 170 and/or any components therein.

As shown in FIG. 5, the computing system 600 can include a processor 610, a memory 620, a storage device 630, and input/output devices 640. The processor 610, the memory 620, the storage device 630, and the input/output devices 640 can be interconnected via a system bus 650. The processor 610 is capable of processing instructions for execution within the computing system 600. Such executed instructions can implement one or more components of, for example, the reconstruction engine 170. In some implementations of the current subject matter, the processor 610 can be a single-threaded processor. Alternately, the processor 610 can be a multi-threaded processor. The processor 610 is capable of processing instructions stored in the memory 620 and/or on the storage device 630 to display graphical information for a user interface provided via the input/output device 640.

The memory 620 is a computer readable medium such as volatile or non-volatile that stores information within the computing system 600. The memory 620 can store data structures representing configuration object databases, for example. The storage device 630 is capable of providing persistent storage for the computing system 600. The storage device 630 can be a floppy disk device, a hard disk device, an optical disk device, or a tape device, or other suitable persistent storage means. The input/output device 640 provides input/output operations for the computing system 600. In some implementations of the current subject matter, the input/output device 640 includes a keyboard and/or pointing device. In various implementations, the input/output device 640 includes a display unit for displaying graphical user interfaces.

According to some implementations of the current subject matter, the input/output device 640 can provide input/output operations for a network device. For example, the input/output device 640 can include Ethernet ports or other networking ports to communicate with one or more wired and/or wireless networks (e.g., a local area network (LAN), a wide area network (WAN), the Internet).

In some implementations of the current subject matter, the computing system 600 can be used to execute various interactive computer software applications that can be used for organization, analysis and/or storage of data in various (e.g., tabular) format (e.g., Microsoft Excel®, and/or any other type of software). Alternatively, the computing system 600 can be used to execute any type of software applications. These applications can be used to perform various functionalities, e.g., planning functionalities (e.g., generating, managing, editing of spreadsheet documents, word processing documents, and/or any other objects, etc.), computing functionalities, communications functionalities, etc. The applications can include various add-in functionalities or can be standalone computing products and/or functionalities. Upon activation within the applications, the functionalities can be used to generate the user interface provided via the input/output device 640. The user interface can be generated and presented to a user by the computing system 600 (e.g., on a computer screen monitor, etc.).

One or more aspects or features of the subject matter described herein can be realized in digital electronic circuitry, integrated circuitry, specially designed application specific integrated circuits (ASICs), field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to as programs, software, software applications, applications, components, or code, include machine instructions for a programmable processor, and can be implemented in a high-level procedural and/or object-oriented programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively, or additionally, store such machine instructions in a transient manner, such as for example, as would a processor cache or other random access memory associated with one or more physical processor cores.

To provide for interaction with a user, one or more aspects or features of the subject matter described herein can be implemented on a computer having a display device, such as for example a cathode ray tube (CRT) or a liquid crystal display (LCD) or a light emitting diode (LED) monitor for displaying information to the user and a keyboard and a pointing device, such as for example a mouse or a trackball, by which the user may provide input to the computer. Other kinds of devices can be used to provide for interaction with a user as well. For example, feedback provided to the user can be any form of sensory feedback, such as for example visual feedback, auditory feedback, or tactile feedback; and input from the user may be received in any form, including, but not limited to, acoustic, speech, or tactile input. Other possible input devices include, but are not limited to, touch screens or other touch-sensitive devices such as single or multi-point resistive or capacitive track pads, voice recognition hardware and software, optical scanners, optical pointers, digital image capture devices and associated interpretation software, and the like.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. Other implementations may be within the scope of the following claims.

What is claimed is:

1. An apparatus, comprising:
    a filter array configured to generate a first illumination pattern in response to a first wavelength of light and generate a second illumination pattern in response to a second wavelength of light, the first illumination pattern and the second illumination pattern being projected onto an object including a specimen and a plurality of probing particles suspended in a medium, the plurality of probing particles moving in the medium surrounding the specimen, and at least a portion of the plurality of particles configured to attach to a surface of the specimen;
    a detector configured to determine a first intensity of a first light emitted by the object in response to the first illumination pattern and determine a second intensity of a second light emitted by the object in response to the second illumination pattern; and
    a reconstruction engine comprising:
        at least one data processor; and
        at least one memory storing instructions which, when executed by the at least one data processor, cause the reconstruction engine to at least:
        generate a first image depicting a first position of the plurality of probing particles at a first time and a second image depicting a second position of the plurality of probing particles at a second time, the first image and the second image generated based at least on the first intensity, the first illumination pattern, the second intensity, and the second illumination pattern; and
        generate, based at least on the first image and the second image, a composite image depicting the specimen.

2. The apparatus of claim 1, wherein the reconstruction engine is further configured to at least determine, based at least on an intensity of a region in the composite image, a chemical composition of the specimen, and wherein the intensity of the region corresponds to a length of time one or more probing particles are attached to a corresponding location on the surface of the specimen.

3. The apparatus of claim 1, wherein the reconstruction engine is further configured to at least determine, based at least on the composite image, a surface geometry of the specimen, and wherein the composite image indicates a boundary of a negative space around the specimen.

4. The apparatus of claim 1, wherein the filter array includes a first etalon and a second etalon, wherein the first etalon and the second etalon are configured with different passbands.

5. The apparatus of claim 4, wherein the first etalon is formed from a first pair of reflective surfaces, wherein the first pair of reflective surfaces is separated by a first distance corresponding to a first passband of the first etalon, wherein the second etalon is formed from a second pair of reflective surfaces, and wherein the second pair of reflective surfaces is separated by a second distance corresponding to a second passband of the second etalon.

6. The apparatus of claim 5, wherein the first pair of reflective surfaces and/or the second pair of reflective surfaces are formed from one or more of a metallic film and/or a dielectric multilayer stack.

7. The apparatus of claim 1, further comprising a light source configured to generate a multi-wavelength light that includes the first wavelength of light and the second wavelength of light.

8. The apparatus of claim 7, wherein the light source comprises a laser configured to deliver one or more pulses of the multi-wavelength light.

9. The apparatus of claim 7, further comprising a dispersive medium, the dispersive medium comprising a frequency-sweeping device including one or more prisms, optical fibers, diffractive gratings, and/or mirrors.

10. The apparatus of claim 9, wherein the dispersive medium is disposed between the light source and the filter array, and wherein the dispersive medium is configured to at least separate the multi-frequency light exiting the light source into the first frequency of light and the second frequency of light.

11. The apparatus of claim 9, wherein the dispersive medium is disposed between the filter array and the detector, and wherein the dispersive medium is configured to separate an output of the filter array into the first illumination pattern corresponding to the first frequency of light and the second illumination pattern corresponding to the second frequency of light.

12. The apparatus of claim 1, wherein the first illumination pattern illuminates one or more different portions of the specimen than the second illumination pattern.

13. The apparatus of claim 1, wherein the detector comprises a charge-coupled device (CCD) sensor, a complementary metal-oxide semiconductor (CMOS) sensor, a thermal sensor, a photodiode, an avalanche photo detector (APD), and/or a photomultiplier tube (PMT).

14. The apparatus of claim 1, wherein the plurality of probing particles comprise one or more molecules.

15. A method, comprising:
generating, in response to a first wavelength of light, a first illumination pattern;
generating, in response to a second wavelength of light, a second illumination pattern;
projecting, onto an object including a specimen and a plurality of probing particles suspended in a medium, the first illumination pattern and the second illumination pattern, the plurality of probing particles moving in the medium surrounding the specimen, and at least a portion of the plurality of particles configured to attach to a surface of the specimen;
determining a first intensity of a first light emitted by the object in response to the first illumination pattern; and
determining a second intensity of a second light emitted by the object in response to the second illumination pattern;
generating a first image depicting a first position of the plurality of probing particles at a first time and a second image depicting a second position of the plurality of probing particles at a second time, the first image and the second image generated based at least on the first intensity, the first illumination pattern, the second intensity, and the second illumination pattern; and
generating, based at least on the first image and the second image, a composite image depicting the specimen.

16. The method of claim 15, wherein the composite image is generated by at least combining data from the first image and the second image to form a heat map and/or a vector map.

17. The method of claim 16, further comprising:
determining, based at least on the composite image, a surface geometry of the specimen, the composite image indicating a boundary of a negative space around the specimen.

18. The method of claim 16, further comprising:
determining, based at least on an intensity of a region in the composite image, a chemical composition of the specimen, the intensity of the region corresponding to a length of time one or more probing particles are attached to a corresponding location on the surface of the specimen.

19. The method of claim 15, wherein the plurality of probing particles comprise one or more molecules.

* * * * *